(12) United States Patent
Liu et al.

(10) Patent No.: US 11,543,310 B2
(45) Date of Patent: Jan. 3, 2023

(54) METHOD FOR MEASURING RESIDUAL STRESS OF CURVED-SURFACE BULK MATERIAL

(71) Applicant: METAL INDUSTRIES RESEARCH&DEVELOPMENT CENTRE, Kaohsiung (TW)

(72) Inventors: Zong-Rong Liu, Kaohsiung (TW); Hsiu-An Tsai, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 200 days.

(21) Appl. No.: 17/126,385

(22) Filed: Dec. 18, 2020

(65) Prior Publication Data

US 2022/0196496 A1 Jun. 23, 2022

(51) Int. Cl.
*G01N 23/207* (2018.01)
*G01L 1/25* (2006.01)

(52) U.S. Cl.
CPC .............. *G01L 1/25* (2013.01); *G01N 23/207* (2013.01)

(58) Field of Classification Search
CPC .............................. G01L 1/25; G01N 23/207
See application file for complete search history.

(56) References Cited

U.S. PATENT DOCUMENTS

2013/0044864 A1* 2/2013 Wang .................. G01L 1/25
378/71

FOREIGN PATENT DOCUMENTS

TW I669501 B 8/2019

* cited by examiner

*Primary Examiner* — David P Porta
*Assistant Examiner* — Mamadou Faye
(74) *Attorney, Agent, or Firm* — WPAT, PC

(57) ABSTRACT

A method for measuring a residual stress of a curved-surface bulk material includes steps of: locating a point at which a to-be-detected curved surface of a curved-surface bulk material has a highest curvature as a to-be-detected point; applying an instrument integrating an X-ray light resource and a detector, measuring the to-be-detected point by using an X-ray diffraction theory, and analyzing and calculating, in combination with a cos α method, a strain value measured by using the instrument; and calculating, in combination with material property measurement data of the curved-surface bulk material, a curved-surface residual stress by introducing a curved-surface bulk material residual stress calculation model.

8 Claims, 3 Drawing Sheets

METHOD FOR MEASURING RESIDUAL STRESS OF CURVED-SURFACE BULK MATERIAL

BACKGROUND

Technical Field

The present invention relates to a method for measuring a residual stress, and in particular, to a method for measuring a curved-surface residual stress of a curved-surface bulk material.

Related Art

As machining, casting and forging, and die and mold industries develop towards a direction of high value, high precision, and functionality, increasing importance is attached to workpiece lifetime and damage analysis. A residual stress is one of important indicators for lifetime and failure analysis.

The residual stress detection is divided into contact detection and non-destructive detection. A blind-hole method is mainly adopted in common contact residual stress measurement. Under a trend of high-value products and real-time measurement, the blind-hole method is gradually inapplicable. Therefore, the development of residual stress measurement will be focused on the non-destructive measurement. The mainstream non-destructive residual stress measurement is an X-ray diffraction method, and the non-destructive measurement can be performed in any manufacturing process and each stage during use, facilitating comprehensive control. However, due to the use of non-contact measurement, a workpiece carrier, material properties, a geometrical shape, and residual stress calculation parameters all have impact on measurement data.

Currently, the development of a residual stress is mainly towards several directions, namely, residual stress calculation module optimization, geometrical impact reduction, residual stress real-time measurement and visualization, and the like. However, there is a lack of measurement for a residual stress of a curved-surface bulk material and measurement for a residual stress taking both a curved surface and portability into consideration.

On the other hand, due to multi-curved geometry of a product and the need for real-time detection and visualization, there is an increasing demand for to achieve on-site measurement and real-time analysis by using a portable detection instrument. However, the related art currently has a problem that an original analysis model is likely to be affected by a shape and consequently it is easy to cause a measurement error and numerical distortion, and other problems.

In addition, Taiwan Patent No. TWI669501 "RESIDUAL STRESS DETECTION DEVICE AND DETECTION METHOD THEREOF" owned by the inventor of the present invention discloses a method for detecting and calculating a surface residual stress of a to-be-detected piece having a curved surface and a coating. The method includes: fixing a to-be-detected piece on a carrier of the to-be-detected piece, and adjusting a to-be-detected point to the highest point; irradiating the to-be-detected point with an X-ray generating source; moving the to-be-detected piece on a path extending along a direction orthogonal to an incident direction of the X-ray, and receiving and detecting intensity of a diffracted X-ray to obtain a strain value; and calculating a residual stress value of the to-be-detected point through a stress calculation module by using the strain value. The foregoing disclosed residual stress algorithm is a method for measuring a residual stress by using $\sin^2 \psi$, and is applicable to a coated material having a curved surface, but is inapplicable to a curved-surface bulk material.

SUMMARY

An objective of the present invention is to provide a method for measuring a residual stress of a curved-surface bulk material, where a residual stress detection instrument integrating an X-ray light resource and a detector is applied, a strain value at a highest point of a to-be-detected curved surface is analyzed and calculated by using a cos α method, and the strain value is substituted into a curved-surface bulk material residual stress calculation model, to obtain a residual stress value of the curved surface.

To achieve the foregoing objective, the present invention provides a method for measuring a residual stress of a curved-surface bulk material, comprising steps of: locating a point at which a to-be-detected curved surface of a curved-surface bulk material has a highest curvature as a to-be-detected point; applying an instrument integrating an X-ray light resource and a detector, measuring the to-be-detected point by using an X-ray diffraction theory, and analyzing and calculating, in combination with a cos α method, a strain value measured by using the instrument; and calculating, in combination with material property measurement data of the curved-surface bulk material, a curved-surface residual stress by introducing a mathematical expression 1 of a curved-surface bulk material residual stress calculation model as below, $$\sigma = E\left[\varepsilon + \left(\chi - \frac{h_b}{2}\right)\kappa\right] \quad \text{[mathematical expression 1]}$$

where σ represents the curved-surface residual stress, E represents a Young's modulus of the bulk material, ε represents the strain value measured by using the instrument, $h_b$ represents a thickness of the bulk material, κ represents a curvature at the highest point of the curved surface, and χ represents a diffraction depth.

The foregoing applied cos α method is used for analyzing four strain values of the to-be-detected point measured by using the instrument in a range of a diffraction ring at an angle α, namely, a strain value at an angle α of a Debye-Scherrer ring, a strain value at an angle −α of the Debye-Scherrer ring, a strain value at an angle π+α of the Debye-Scherrer ring, and a strain value at an angle π−α of the Debye-Scherrer ring, and the four strain values are substituted into a mathematical expression 2 as below to obtain the strain value measured by using the instrument.

$$\varepsilon = \tfrac{1}{2}[(\varepsilon_\alpha - \varepsilon_{\pi+\alpha}) + (\varepsilon_{-\alpha} - \varepsilon_{\pi-\alpha})] \quad \text{[mathematical expression 2]}$$

where ε represents the strain value measured by using the instrument, $\varepsilon_\alpha$ represents the strain value at the angle α of the Debye-Scherrer ring, $\varepsilon_{-\alpha}$ represents the strain value at the angle −α of the Debye-Scherrer ring, $\varepsilon_{\pi+\alpha}$ represents the strain value at the angle π+α of the Debye-Scherrer ring, and $\varepsilon_{\pi-\alpha}$ represents the strain value at the angle π−α of the Debye-Scherrer ring.

In some embodiments, the instrument is an instrument integrating the X-ray light resource and the detector on a same side relative to the to-be-detected point.

In some embodiments, the instrument is a portable instrument.

In some embodiments, a locating manner of the to-be-detected point is a manner in which the curved-surface bulk material is fixed on a curved-surface fixing platform in combination with the curved-surface fixing platform, and a position of the to-be-detected point is calibrated to keep the to-be-detected point at a horizontal highest point relative to the curved-surface fixing platform.

In some embodiments, the curved-surface fixing platform comprises a slot for placing a to-be-detected piece, a locking device, and a leveling device, the slot for placing a to-be-detected piece being configured to accommodate the curved-surface bulk material, the locking device being configured to lock the curved-surface bulk material in the slot for placing a to-be-detected piece, and the leveling device being configured to keep the to-be-detected point at the horizontal highest point in combination with a fastening force of the locking device.

In some embodiments, the locking device is a screw structure capable of screwing a front end out of or into a side wall of the slot for placing a to-be-detected piece, to butt and fix or release the curved-surface bulk material.

In some embodiments, the foregoing leveling device is a screw structure capable of screwing a front end out of or into the bottom of the slot for placing a to-be-detected piece, to lift up or lower the curved-surface bulk material.

The present invention has at least the following characteristics: a measurement model provided in the present invention may be applicable to measuring a residual stress of a curved-surface bulk material, to resolve a problem that the existing measurement technology cannot precisely quantize a residual stress of a curved-surface bulk material, and other problems. By using the measurement model, the fixing platform, and the integrated potable X-ray diffractometer provided by the present invention, a measurement error can be reduced, curved surface impact factors can be reduced, geometrical features can be effectively controlled, and a measurement error caused by deviation of a residual stress measurement point on the curved surface can be eliminated. Due to a characteristic of a cos α method used in the present invention to measure a residual stress, the method can be applicable to on-site real-time measurement in combination with a portable instrument.

DETAILED DESCRIPTION

Figure 1:
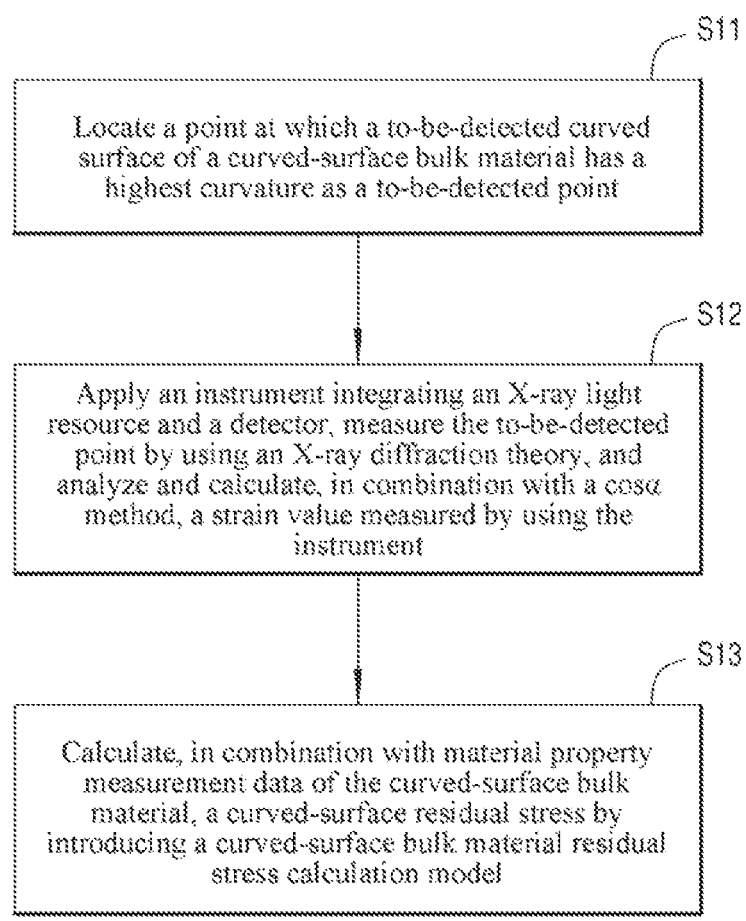
FIG. 1 is a flowchart of a method for measuring a residual stress of a curved-surface bulk material according to an embodiment of the present invention.

Embodiments of the present invention are described in detail below with reference to the accompanying drawings, the accompanying drawings are mainly simplified schematic diagrams, and only exemplify the basic structure of the present invention schematically. Therefore, only the components related to the present invention are shown in the drawings, and are not drawn according to the quantity, shape, and size of the components during actual implementation. During actual implementation, the type, quantity, and proportion of the components may be changed, and the layout of the components may be more complex.

The following description of various embodiments is provided to exemplify the specific embodiments of the present invention with reference to accompanying drawings. The directional terms mentioned in the present invention, for example, "upper", "lower", "before", "after", "left", "right", "inside", "outside", and "side", are only references to the directions in the drawings. Therefore, the used direction terms are intended to describe and understand this application, but are not intended to limit this application. In addition, in the specification, unless explicitly described as contrary, the word "include" is understood as referring to including the element, but does not exclude any other elements.

Figure 2:
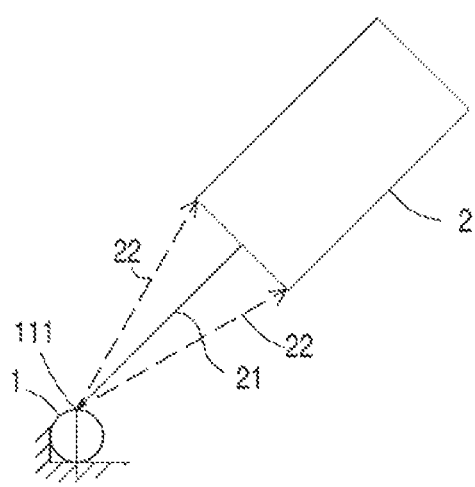
FIG. 2 is a schematic diagram of a detection manner of a device for measuring a residual stress of a curved-surface bulk material according to an embodiment of the present invention.
Figure 3:
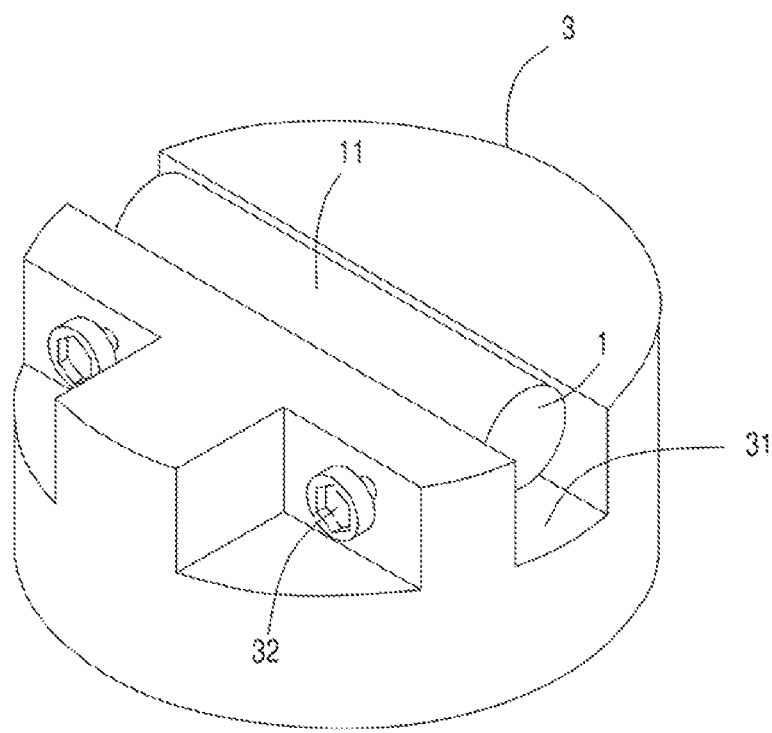
FIG. 3 is a three-dimensional view of locating a curved-surface bulk material by using a curved-surface fixing platform according to an embodiment of the present invention.

Refer to FIG. 1 and FIG. 2. In this embodiment, the method for measuring a residual stress of a curved-surface bulk material includes step S11 to step S13 as follows:

Step S11. Locate a point at which a to-be-detected curved surface 11 of a curved-surface bulk material 1 has a highest curvature as a to-be-detected point 111, as shown in FIG. 2. The curved-surface bulk material 1 may be a bulk material of a round rod type having a same curvature, or may be a bulk material whose surface has a plurality of curvatures. If the curved-surface bulk material 1 is a large bulk material, an instrument is set up on site to perform detection. If the curved-surface bulk material 1 is in a small size, a curved-surface fixing platform 3 described below is used to locate the curved-surface bulk material, as shown in FIG. 3.

Step S12. Apply an instrument integrating an X-ray light resource and a detector, irradiate the to-be-detected point according to an X-ray diffraction theory with an X-ray 21 from the X-ray light resource, receive and measure a diffracted light 22 of the X-ray by the detector, and analyze and calculate, in combination with a cos α method, a strain value ε measured by using the instrument.

Step S13. Calculate, in combination with material property measurement data of the curved-surface bulk material 1, for example, a diffraction depth χ of the X-ray 21, a Young's modulus E of the bulk material, a thickness $h_b$ of the bulk material, and a curvature κ at the highest point on the curved surface of the bulk material, a curved-surface residual stress σ of the curved surface by introducing a curved-surface bulk material residual stress calculation model, that is, a mathematical expression 1 as below.

$$\sigma = E\left[\varepsilon + \left(\chi - \frac{h_b}{2}\right)\kappa\right] \qquad \text{[mathematical expression 1]}$$

The foregoing cos α method is used for analyzing four strain values of a Debye-Scherrer ring of the to-be-detected point measured by using the instrument in a range of a diffraction ring at an angle α, the four strain values respectively corresponding to a strain value at an angle α of the Debye-Scherrer ring, a strain value at an angle −α of the Debye-Scherrer ring, a strain value at an angle π+α of the Debye-Scherrer ring, and a strain value at an angle π−α of the Debye-Scherrer ring, and the four strain values are substituted into a mathematical expression 2 as below to obtain the strain value F measured by using the instrument.

$$\varepsilon = \frac{1}{2}[(\varepsilon_\alpha - \varepsilon_{\pi+\alpha}) + (\varepsilon_{-\alpha} - \varepsilon_{\pi-\alpha})] \quad \text{[mathematical expression 2]}$$

To meet a requirement of on-site measurement, the instrument provided in the present invention integrates the X-ray light resource and the detector on a same side relative to the to-be-detected point. The X-ray light resource and the detector may even be disposed in a same case, to help to set up a to-be-detected workpiece on site, and further form a portable instrument for measuring a residual stress.

In some embodiments, a locating manner of the to-be-detected point is a manner in which the curved-surface bulk material is fixed on a curved-surface fixing platform in combination with the curved-surface fixing platform, and a position of the to-be-detected point is calibrated to keep the to-be-detected point at a horizontal highest point relative to the curved-surface fixing platform.

In some embodiments, the curved-surface fixing platform includes a slot for placing a to-be-detected piece, a locking device, and a leveling device, the slot for placing a to-be-detected piece being configured to accommodate the curved-surface bulk material, the locking device being configured to lock the curved-surface bulk material in the slot for placing a to-be-detected piece, and the leveling device being configured to keep the to-be-detected point at the horizontal highest point in combination with a fastening force of the locking device.

Figure 4:
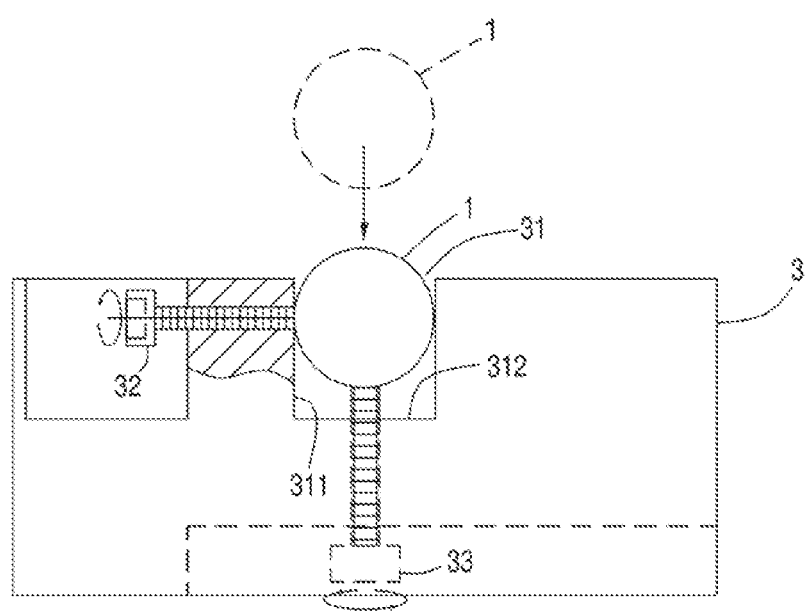
FIG. 4 is a schematic side view of the curved-surface fixing platform in FIG. 3 in which the curved-surface bulk material is placed and located and a locking device and a leveling device act on the curved-surface bulk material.

As shown in FIG. 4, in some embodiments, the locking device is a screw structure capable of screwing a front end out of or into a side wall 311 of the slot for placing a to-be-detected piece, to butt and fix or release the curved-surface bulk material, and the leveling device is a screw structure capable of screwing the front end out of or into the bottom 312 of the slot for placing a to-be-detected piece, to lift up or lower the curved-surface bulk material.

The point at which the curvature is highest can be quickly found by designing a concave slot 31 for placing a to-be-detected piece of the foregoing curved-surface fixing platform 2. For example, the curved-surface bulk material 1 is placed in parallel inside the slot 31 for placing a to-be-detected piece, the curved-surface bulk material 1 is slightly fixed by using the locking device 32, that is, the highest point on the curved surface 11 may be found by using a top surface of the curved-surface fixing platform 2 as a benchmark, and then, the curved-surface bulk material 1 is lifted up by using the leveling device 33 to lift up the to-be-detected point 11. In this way, a measurement error brought by a portable residual-stress measurement instrument can be reduced, curved surface impact factors can be reduced, geometrical features can be effectively controlled, and a measurement error caused by deviation of a residual stress measurement point on a curved surface can be eliminated.

The above embodiments merely exemplify the principles, features, and effects of the present invention, but are not intended to limit the implementation scope of the present invention. A person skilled in the art can modify or change the above embodiments without departing from the spirit and scope of the present invention. Any equivalent change or modification made using the contents disclosed by the present invention shall remain within the scope of the claims below.

What is claimed is:

1. A method for measuring a residual stress of a curved-surface bulk material, comprising steps of:
locating a point at which a to-be-detected curved surface of a curved-surface bulk material has a highest curvature as a to-be-detected point;
applying an instrument integrating an X-ray light resource and a detector, measuring the to-be-detected point by using an X-ray diffraction theory, and analyzing and calculating, in combination with a cos α method, a strain value measured by using the instrument; and
calculating, in combination with material property measurement data of the curved-surface bulk material, a curved-surface residual stress of the curved surface by introducing a mathematical expression 1 of a curved-surface bulk material residual stress calculation model as below, $$\sigma = E\left[\varepsilon + \left(\chi - \frac{h_b}{2}\right)\kappa\right] \quad \text{[mathematical expression 1]}$$

wherein σ represents the curved-surface residual stress, E represents a Young's modulus of the bulk material, ε represents the strain value measured by using the instrument, $h_b$ represents a thickness of the bulk material, κ represents a curvature at the highest point of the curved surface, and χ represents a diffraction depth.

2. The method for measuring a residual stress of a curved-surface bulk material according to claim 1, wherein the cos α method is used for analyzing four strain values of the to-be-detected point measured by using the instrument in a range of a diffraction ring at an angle α, and the four strain values are substituted into a mathematical expression 2 as below to obtain the strain value measured by using the instrument, $$\varepsilon = \frac{1}{2}[(\varepsilon_\alpha - \varepsilon_{\pi+\alpha}) + (\varepsilon_{-\alpha} - \varepsilon_{\pi-\alpha})] \quad \text{[mathematical expression 2]}$$

wherein ε represents the strain value measured by using the instrument, $\varepsilon_\alpha$ represents a strain value at an angle α of a Debye-Scherrer ring, $\varepsilon_{-\alpha}$ represents a strain value at an angle −α of the Debye-Scherrer ring, $\varepsilon_{\pi+\alpha}$ represents a strain value at an angle π+α of the Debye-Scherrer ring, and $\varepsilon_{\pi-\alpha}$ represents a strain value at an angle π−α of the Debye-Scherrer ring.

3. The method for measuring a residual stress of a curved-surface bulk material according to claim 1, wherein the instrument is an instrument integrating the X-ray light resource and the detector on a same side relative to the to-be-detected point.

4. The method for measuring a residual stress of a curved-surface bulk material according to claim 1, wherein the instrument is a portable instrument.

5. The method for measuring a residual stress of a curved-surface bulk material according to claim 1, wherein a locating manner of the to-be-detected point is a manner in which the curved-surface bulk material is fixed on a curved-surface fixing platform in combination with the curved-surface fixing platform, and a position of the to-be-detected point is calibrated to keep the to-be-detected point at a horizontal highest point relative to the curved-surface fixing platform.

6. The method for measuring a residual stress of a curved-surface bulk material according to claim 5, wherein the curved-surface fixing platform comprises a slot for placing a to-be-detected piece, a locking device, and a leveling device, the slot for placing a to-be-detected piece being configured to accommodate the curved-surface bulk material, the locking device being configured to lock the curved-surface bulk material in the slot for placing a to-be-detected piece, and the leveling device being configured to keep the to-be-detected point at the horizontal highest point in combination with a fastening force of the locking device.

7. The method for measuring a residual stress of a curved-surface bulk material according to claim 6, wherein the locking device is a screw structure capable of screwing a front end out of or into a side wall of the slot for placing a to-be-detected piece, to butt and fix or release the curved-surface bulk material.

8. The method for measuring a residual stress of a curved-surface bulk material according to claim 6, wherein the leveling device is a screw structure capable of screwing a front end out of or into the bottom of the slot for placing a to-be-detected piece, to lift up or lower the curved-surface bulk material.

\* \* \* \* \*